United States Patent
Borufka et al.

(10) Patent No.: US 7,367,775 B2
(45) Date of Patent: May 6, 2008

(54) APPARATUS AND METHOD FOR OPTIMIZING VIBRATION OF A GAS TURBINE

(75) Inventors: Hans-Peter Borufka, Starnberg (DE); Klaus Pirker, Munich (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 10/560,399

(22) PCT Filed: Jun. 3, 2004

(86) PCT No.: PCT/DE2004/001137

§ 371 (c)(1), (2), (4) Date: Aug. 2, 2006

(87) PCT Pub. No.: WO2004/111393

PCT Pub. Date: Dec. 23, 2004

(65) Prior Publication Data

US 2006/0275127 A1     Dec. 7, 2006

(30) Foreign Application Priority Data

Jun. 12, 2003 (DE) ................................ 103 26 533

(51) Int. Cl.
*F01D 25/04* (2006.01)
(52) U.S. Cl. ................... 415/119; 415/199.4; 416/175; 416/203
(58) Field of Classification Search ................ 416/203, 416/175, 198 A, 200 A; 415/195, 194
See application file for complete search history.

(56) References Cited

U.S. PATENT DOCUMENTS 1,534,721 A     4/1925 Lasche
3,006,603 A  *  10/1961 Caruso et al. .............. 415/195

FOREIGN PATENT DOCUMENTS

EP     0 921 274 A2    6/1999
EP       921274 A2  *  6/1999

* cited by examiner

*Primary Examiner*—Richard A. Edgar
(74) *Attorney, Agent, or Firm*—Crowell & Moring LLP

(57) ABSTRACT

A rotor comprising several blades rotating together with the rotor, particularly running blades, and the blades forming at least one blade ring, is disclosed. The blades within the, or each, blade ring are arranged at a different distance from one another.

10 Claims, 2 Drawing Sheets

APPARATUS AND METHOD FOR OPTIMIZING VIBRATION OF A GAS TURBINE

This application claims the priority of International Application No. PCT/DE2004/001137, filed Jun. 3, 2004, and German Patent Document No. 103 26 533.3, filed Jun. 12, 2003, the disclosures of which are expressly incorporated by reference herein.

BACKGROUND AND SUMMARY OF THE INVENTION

The invention relates to a rotor for a gas turbine. Furthermore, the invention relates to a gas turbine having a rotor.

Modern gas turbines, particularly modern airplane engines, have to meet the highest demands with respect to reliability, weight, power, economic efficiency and durability. In the development of engines of this type which meet the above-mentioned requirements, various criteria have to be observed. For example, reference is made here to aerodynamics, vibration mechanics, stability and wave dynamics as well as production engineering and material science.

Gas turbines, particularly airplane engines, consist of several assemblies. The combustion chamber, the fan, the high-pressure turbine as well as the low-pressure turbine and the high-pressure compressor as well as the low-pressure compressor should be mentioned here as assemblies of gas turbines. The high-pressure compressor, the low-pressure compressor, the high-pressure turbine as well as the low-pressure turbine, as a rule, comprise several stages. In the case of the fan, a bladed fan rotor rotates with respect to a stationary fan housing. In the case of the compressor, particularly a high-pressure compressor and a low-pressure compressor, as well as in the case of the turbine, particularly the high-pressure turbine and the low-pressure turbine, a bladed rotor also rotates with respect to a stationary stator. The blades assigned to a turbine rotor or compressor rotor which rotate together with the rotor are called moving blades. These moving blades of the rotating rotor rotate relative to stationary guide blades assigned to the stator.

During the rotation of a bladed rotor with respect to a stationary stator, particularly a stationary housing or stationary guide blades, the stationary assemblies are excited to carry out vibrations as a result of the movement of the rotor. However, vibrations within the gas turbine or the airplane engine are disadvantageous because, as a result of the vibrations, the assemblies of the gas turbine are subjected to increased stress and thus to increased wear. Particularly resonance vibrations should be avoided. A gas turbine should therefore also be optimized with respect to the vibration mechanics.

In view of the above, the present invention is based on the problem of creating a novel rotor for a gas turbine as well as a corresponding gas turbine which are optimized with respect to vibration mechanics.

According to the invention, the blades of the rotor within the blade ring or within each blade ring are arranged at a different distance or a different blade pitch with respect to one another. As a result, it is ensured that the frequency at which the idle assemblies are excited to vibrate will change. Resonance vibrations are therefore avoided.

According to an advantageous further development of the invention, in the case of diametrically opposite blades, the distance to the respective next blade situated in front as well as the distance to the respective next blade situated in the rear is the same. The spacing of the blades within the blade ring or within each blade ring is dimensioned such that imbalances cancel each other out. This also has vibration-mechanical advantages.

Preferred further developments of the invention are indicated in the following description.

BRIEF DESCRIPTION OF THE DRAWINGS

An embodiment of the invention will be described by means of the drawings, while the invention is not limited thereto.

DETAILED DESCRIPTION OF THE DRAWINGS

Figure 1:
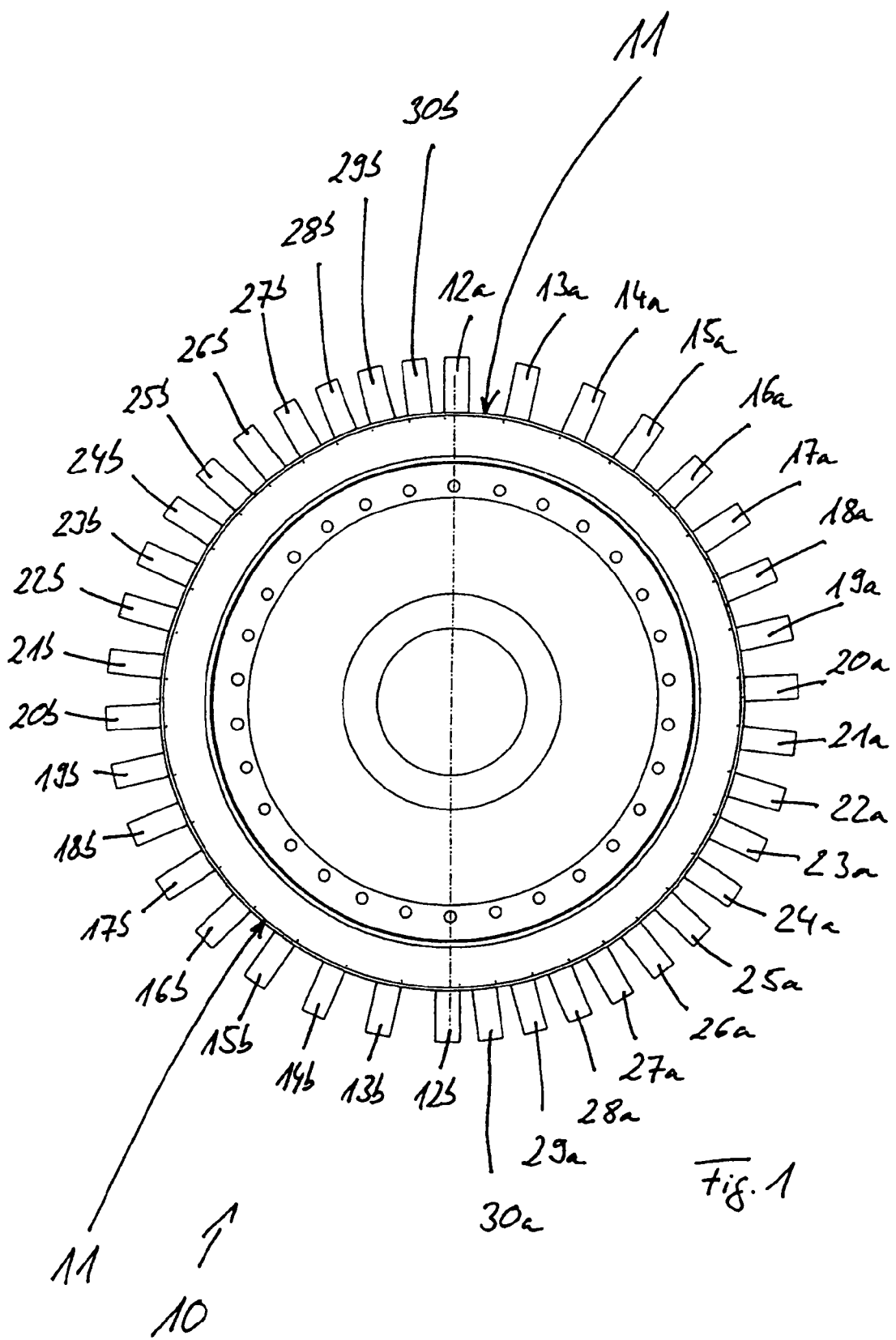
FIG. 1 is a frontal view of a rotor according to the invention.
Figure 2:
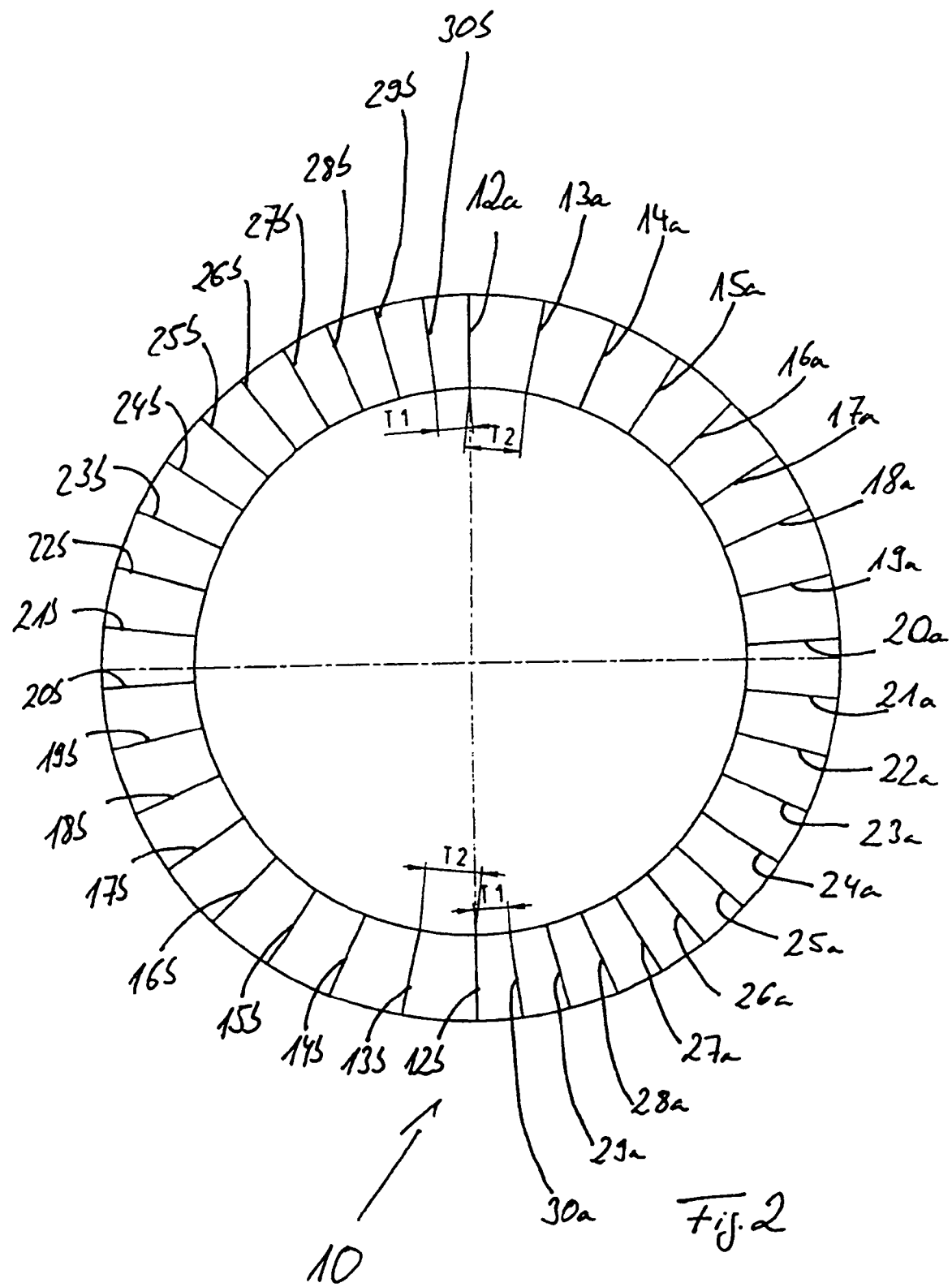
FIG. 2 is a schematic frontal view of the rotor according to the invention for illustrating the blade arrangement.

In the following, the present invention will be explained in greater detail with reference to FIGS. 1 and 2. FIG. 1 is a frontal view of a rotor having several blades arranged on the rotor. FIG. 2 is a very schematic representation of a rotor for illustrating the construction principle according to the invention.

FIG. 1 shows a rotor 10 having several blades 12a, 13a, 14a, 15a, 16a, 17a, 18a, 19a, 20a, 21a, 22a, 23a, 24a, 25a, 26a, 27a, 28a, 29a, 30a, 12b, 13b, 14b, 15b, 16b, 17b, 18b, 19b, 20b, 21b, 22b, 23b, 24b, 25b, 26b, 27b, 28b, 29b and 30b arranged on an outer generated surface 11 or on the circumference of the rotor 10. The blades 12a to 30b shown in FIG. 1 form a blade ring which extends along the generated surface 11 or the circumference of the rotor 10. This blade ring forms a step of the rotor. For forming several steps, several such blade rings can be arranged axially behind one another.

For optimizing the vibration behavior of the rotor 10 or of a gas turbine having the rotor 10, the blades 12a to 30b are arranged at a different mutual distance within the blade ring. In other words, this means that the blade pitch changes within the blade ring.

The spacing of the blades within the blade ring or within each blade ring can continuously or discontinuously change in the circumferential direction or in the rotating direction of the rotor 10. A continuous change of the spacing of the blades or a continuous change of the blade pitch means that the distance between the blades, from one blade to the next, either continuously increases or continuously decreases. A discontinuous change of the blade pitch therefore means that the change of the distance between the individual blades 12a to 30b does not follow this regularity. However, irrespective of whether the blade pitch or the spacing of the blades 12a to 30b changes continuously or discontinuously, care should be taken that the imbalances on the rotor 10 occurring because of the changing blade pitch will cancel one another out. Summarizing, the rotor 10 according to the invention therefore has no imbalance.

FIG. 1 shows a preferred arrangement of the blades 12a to 30b of a blade ring of a rotor 10 along its generated surface 11. Diametrically opposite blades of the rotor 10 are provided with the same reference numbers 12, 13, 14 . . . 30 but can be distinguished from one another by the addition a or b. The blades 12a to 30b of the rotor 10 are now arranged along the generated surface 11 or the circumference of the rotor 10 such that, in the case of mutually diametrically opposite blades 12a and 12b, 13a and 13b, 14a and 14b, . . . 30a and 30b respectively, the distance to the respective next blade situated in front, as well as the distance to the respective next blade situated in the rear, is identical. For the diametrically opposite blades 12a and 12b, this means that the distance between blades 12a and 13a corresponds to the distance between blades 12b and 13b. Furthermore, the distance between blades 12a and 30b corresponds to the distance between blades 12b and 30a. Analogously, the distance between blades 13a and 14a corresponds to the distance between blades 13b and 14b, or the distance between blades 23a and 24a corresponds to the distance between blades 23b and 24b.

The blade ring consisting of blades 12a to 30b illustrated in FIG. 1 is therefore divided into two half rings, a first half ring comprising blades 12a to 30a and a second half ring comprising blades 12b to 30b. Starting from blade 12a or 12b, the distance to the next blade decreases continuously within each of the half rings; that is, the distance between blades 12a and 13a or 12b and 13b within the half ring or of the corresponding half ring is the greatest, and the distance between blades 29a and 30a as well as 29b and 30b within the half rings is the smallest. The smallest distance between the blades within the entire blade ring is formed between the adjacent blades of the half rings, thus, on the one hand, between blades 12a and 30b as well as between blades 12b and 30a.

As a result of the arrangement of blades 12a to 30b along the circumference of the rotor 10 described in connection with FIG. 1, it is ensured that the frequency at which the rotor or at which the blades of the rotor excite stationary assemblies of a gas turbine to carry out vibrations changes continuously. Accordingly, stationary assemblies of the gas turbine are not excited at a frequency that stays the same and are therefore not caused to carry out resonance vibrations. On the whole, this results in a vibration-optimized construction of the rotor 10 or of the gas turbine comprising the rotor 10. Further, the blade arrangement described in connection with FIG. 1 ensures that the rotor 10 has no imbalance.

As mentioned above, several such blade rings of individual blades can be arranged in the axial direction of the rotor 10. In this case, the arrangement of the blades within the respective blade ring may be identical as well as different for each blade ring.

In a very schematic manner, FIG. 2 shows the construction principle for the rotor 10 according to the invention. Thus, in FIG. 2, the longitudinal axes or the axes of symmetry of the individual blades 12a to 30b are illustrated as lines. The distance between these longitudinal axes of the blades determines the blade pitch within the blade ring. In FIG. 2, the distance or the blade pitch is indicated by symbols T1 and T2. In the case of mutually diametrically opposite blades, the blade pitch is again designed such that the blade pitch with respect to the respective next blade situated in front as well as with respect to the respective next blade situated to the rear is the same.

The above-described construction principle according to the invention for a rotor can be used for all rotors of a gas turbine, particularly for all rotors of an airplane engine. Thus, the rotor can be constructed as a turbine rotor or compressor rotor of a turbine or of a compressor of a gas turbine, particularly an airplane engine. In this case, the blades 12a to 30b are running blades of the turbine rotor or compressor rotor which rotate with respect to stationary guide blades of a stator or of a housing of the gas turbine. However, the rotor can also be constructed as a fan rotor of a fan of a gas turbine. The rotor may also be a so-called blisk (bladed disk) or bling (bladed ring) of a gas turbine, in the case of a blisk or a bling, the blades being an integral component of the rotor.

The invention claimed is:

1. A rotor for a gas turbine, having blades forming a blade ring and the blades within the blade ring being arranged at a different distance from one another and thus with a different blade pitch, a distance between the blades within the blade ring changing continuously or discontinuously in a circumferential direction and the distance between the blades within the blade ring dimensioned such that an imbalance is canceled out, wherein the rotor has a first rotatable blade ring and a second rotatable blade ring arranged axially behind one another in the rotor, wherein, within each of the first and second blade rings of the rotor the blades are arranged at a different distance from one another, and wherein a first arrangement of the different distances of the blades within the first blade ring of the rotor is different from a second arrangement of the different distances of the blades within the second blade ring of the rotor.

2. The rotor according to claim 1, wherein the rotor is a turbine rotor or compressor rotor of a gas turbine.

3. The rotor according to claim 2, wherein the gas turbine is a turbine of an airplane engine.

4. The rotor according to claim 1, wherein the rotor is a fan rotor of a gas turbine.

5. The rotor according to claim 4, wherein the gas turbine is a turbine of an airplane engine.

6. The rotor according to claim 1, wherein the rotor is a blisk (bladed disk) or bling (bladed ring) of a gas turbine and wherein the blades are an integral component of the rotor.

7. The rotor according to claim 6, wherein the gas turbine is a turbine of an airplane engine.

8. A rotor for a gas turbine, comprising:
a first rotatable blade ring in the rotor; and
a second rotatable blade ring in the rotor;
wherein the first and the second rotatable blade rings in the rotor are arranged axially one behind the other and wherein on each rotatable blade ring the blades are arranged such that a first blade is positioned at a first distance from a second blade and the second blade is positioned at a second distance from a third blade, wherein the first distance is different from the second distance;
and further wherein a first arrangement of the different distances of the blades within the first blade ring in the rotor is different from a second arrangement of the different distances of the blades within the second blade ring in the rotor.

9. The rotor according to claim 8, wherein on each blade ring a fourth blade is positioned at the first distance from a fifth blade and the fifth blade is positioned at the second distance from a sixth blade and wherein the first, second, and third blades are located diametrically opposed from the fourth, fifth, and sixth blades, respectively, on the blade ring.

10. A method for optimizing vibrations in a gas turbine engine, comprising the steps of:
rotating a first blade ring of a rotor;
rotating a second blade ring of the rotor, wherein the first and second rotating blade rings of the rotor are arranged axially behind one another;
wherein on each blade ring the blades are arranged such that a first blade is positioned at a first distance from a second blade and the second blade is positioned at a second distance from a third blade and wherein the first distance is different from the second distance and wherein a first arrangement of the different distances of the blades within the first blade ring in the rotor is different from a second arrangement of the different distances of the blades within the second blade ring in the rotor; and
continuously changing a frequency of a vibration of a stationary assembly of the gas turbine by rotating the first and second blade rings of the rotor.

* * * * *